United States Patent
Leyrer et al.

(10) Patent No.: US 6,707,902 B2
(45) Date of Patent: Mar. 16, 2004

(54) METHOD OF RESYNCHRONIZING DATA TRANSFER BETWEEN TWO MODEMS CONNECTED BY A DEDICATED LINE

(75) Inventors: Thomas Leyrer, Geisenhausen (DE); Umashankar Iyer, Allen, TX (US); Sharmila Kannangara, Reston, VA (US)

(73) Assignee: Texas Instruments Incorporated, Dallas, TX (US)

( * ) Notice: Subject to any disclaimer, the term of this patent is extended or adjusted under 35 U.S.C. 154(b) by 527 days.

(21) Appl. No.: 09/819,869

(22) Filed: Mar. 28, 2001

(65) Prior Publication Data

US 2002/0141563 A1 Oct. 3, 2002

(30) Foreign Application Priority Data

Mar. 31, 2000 (DE) .......................... 100 16 169

(51) Int. Cl.$^7$ .......................... H04M 3/00; H04M 5/00; H04J 1/00; H04L 7/00
(52) U.S. Cl. .......................... 379/243; 375/354; 370/480
(58) Field of Search .......................... 379/242, 243, 379/245, 207.16, 90.01, 93.01, 93.06, 93.07; 370/478, 480, 485, 486, 493, 498; 375/260, 354, 355, 356, 357

(56) References Cited

U.S. PATENT DOCUMENTS 5,933,454 A * 8/1999 Cioffi .......................... 375/260
6,307,868 B1 * 10/2001 Rakib et al. .......................... 370/485

* cited by examiner

*Primary Examiner*—Benny Tieu
(74) *Attorney, Agent, or Firm*—Frederick J. Telecky, Jr.; W. James Brady, III

(57) ABSTRACT

A method of resynchronizing data transfer between a first modem assigned to a central office and connected by a dedicated line a second modem assigned to a remote subscriber following a fault caused by a ringing signal. A ringing ID is set up in the central office modem as soon as a ringing signal is to be sent to the subscriber modem, and a ringing alert is transferred to the connected subscriber modem. Transmission of the pilot tone accompanying the data transfer set by the central office modem is interrupted as is the clock frequency synchronization implemented during data transfer in the subscriber modem with the pilot tone as reference. The two modems are put on hold to save the characteristic parameters for the momentary data transfer followed by transfer of the ringing signal via the dedicated line to the subscriber modem. The ringing ID is reset in the central office modem, the pilot tone is resent via the central office modem and reinstating synchronization of the clock frequency reinstated in making use of the pilot tone as reference. The prior data transfer mode of using the saved characteristic parameters and the subscriber modem is synchronized to the data stream coming from the central office modem by searching for and detecting specific code groups occurring regularly in the transferred data stream.

2 Claims, 1 Drawing Sheet

METHOD OF RESYNCHRONIZING DATA TRANSFER BETWEEN TWO MODEMS CONNECTED BY A DEDICATED LINE

BACKGROUND OF THE INVENTION

The invention relates to a method of resynchronizing data transfer between two modems connected by a dedicated line following a fault caused by a ringing signal, whereby at least one of the modems is assigned to a central office and the other modem is assigned to a remote subscriber.

To an ever-increasing extent dedicated lines between a central office and remote subscribers are being put to use for data transfer. Via these dedicated lines, consisting of the usual two-core telephone line, voice signals are transferred in addition to the data, meaning that in addition to normal telephone calls data can be handled by these lines. Simultaneous transfer of data and voice signals can be implemented without the one influencing the other since transfer is done in different frequency ranges which are no trouble to be kept apart.

However, problems are caused by the ringing signal transferred via the dedicated line from the central office to the remote subscriber since this ringing signal as compared to the other signals transferred has a very high level and thus results in interference and even interruption of the data transfer. The modem connected to the dedicated line at the central office end and the modem connected to the dedicated line at the subscriber end are no longer synchronized to each other on termination of the ringing signal and thus no longer permitting safe data transfer. To get round this problem it is necessary to not only implement resynchronization in which it is ensured that the subscriber modem is able to "see" the characteristic structure of the transfer data, i.e. the start of data blocks and groups thereof but also, by means of time-intensive sensing procedures, to sense the parameters of the transfer line which also affect the data stream being transferred. It is particularly this sensing of the line parameters that takes up a lot of time so that roughly 10 seconds are lost by known resynchronization methods until data transfer can be reassumed after a ringing signal.

SUMMARY OF THE INVENTION

The invention is based on the object of minimizing the interruption of data transfer via the dedicated line caused by transfer of a ringing signal.

This object is achieved in accordance with the invention by a method of resynchronizing data transfer between two modems connected via a dedicated line after an interruption caused by a ringing signal in which at least one of the modems is assigned to a central office and the other modem is assigned to a remote subscriber, comprising the following steps:

a) setting a ringing ID in the central office modem as soon as a ringing signal is to be sent to the subscriber modem connected via the dedicated line;

b) transferring a ringing alert to the connected subscriber modem;

c) interrupting transmission of the pilot tone accompanying the data transfer set by the central office modem and interrupting clock frequency synchronization implemented during data transfer in the subscriber modem with the pilot tone as reference;

d) signalling the central office modem and subscriber modem on hold to save the characteristic parameters for the momentary data transfer in the two modems followed by transfer of the ringing signal via the dedicated line to the subscriber modem;

e) resetting the ringing TDin the central office modem;

f) resending the pilot tone via the central office modem and reinstating synchronization of the clock frequency in making use of the pilot tone as reference;

g) reestablishing the data transfer mode existing prior to step d) in making use of the characteristic parameters as saved before;

h) synchronizing the subscriber modem to the data stream coming from the central office modem by searching for and detecting specific code groups occurring regularly in the transferred data stream.

In the method in accordance with the invention the subscriber modem is alerted by the central office as to the transfer of a ringing signal. Since in the method in accordance with the invention characteristic parameters of the momentary data transfer are saved prior to sensing the ringing signal, it is possible to reinstate the mode existing before, after the ringing signal, without it being necessary to implement the time-consuming business of sensing the transfer parameters, especially the line parameters so that the procedures taking up most time in resynchronizing are now no longer needed. All that is still needed is to implement sensing the characteristic code groups in the data stream to resynchronize the subscriber modem to the central office modem.

BRIEF DESCRIPTION OF THE DRAWINGS

An example embodiment of the method in accordance with the invention will now be detailed with reference to the drawing in which.

DETAILED DESCRIPTION OF THE DRAWINGS

Figure 1:
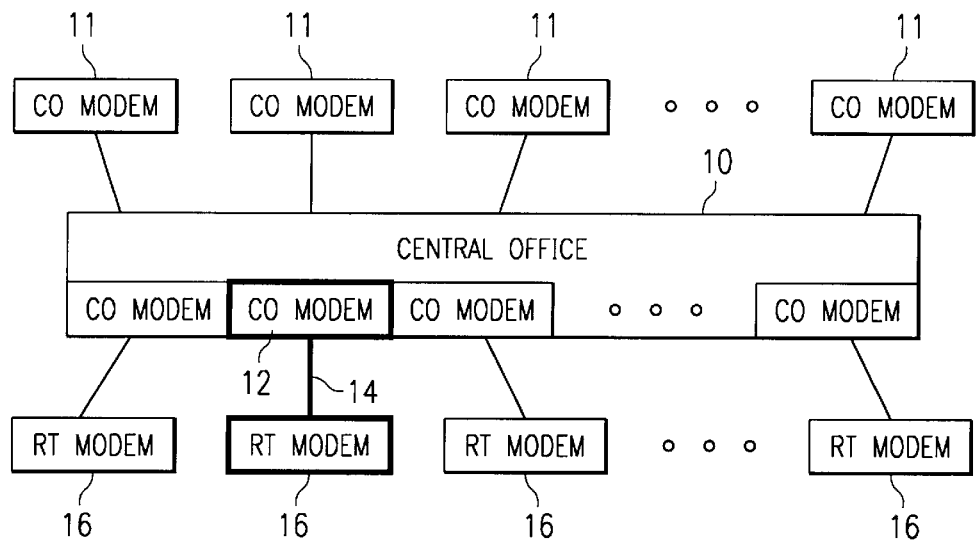
FIG. 1 is a schematic illustration of a system for data transfer via a central office modem to a subscriber modem.
Figure 2:
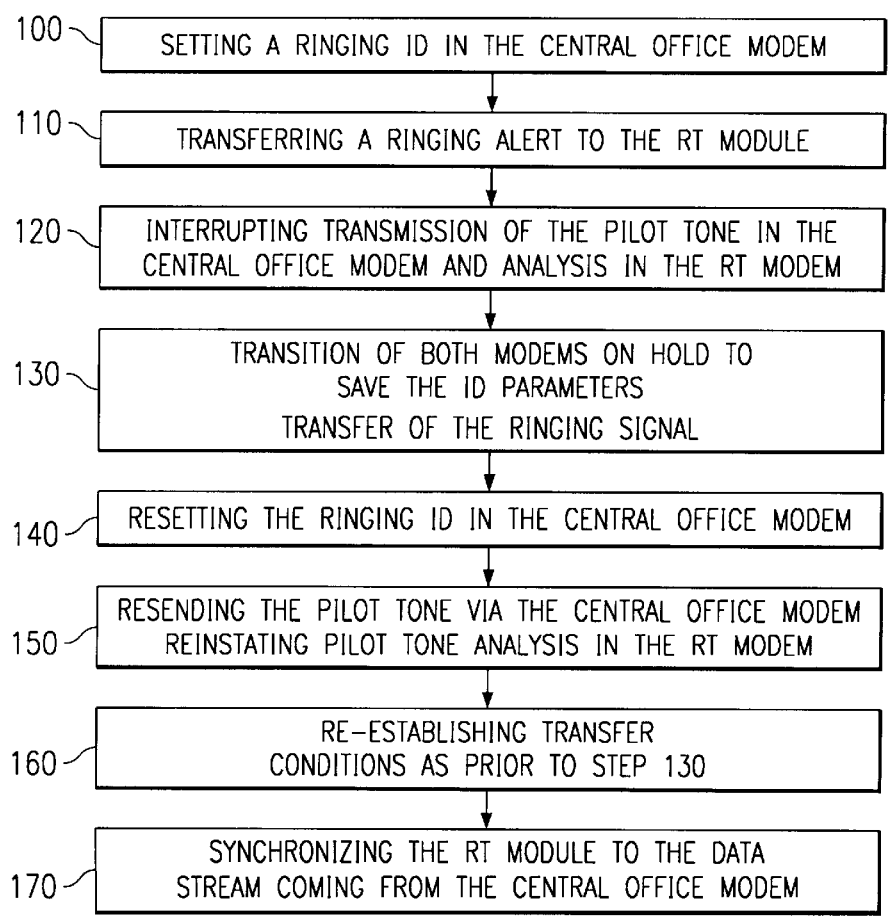
FIG. 2 is a flow chart of the sequence involved in the method in accordance with the invention.

Referring now to FIG. 1 there is illustrated a central office 10 abbreviated CO in the following. This central office 10 receives data from modems 11 located at the output end of further central offices. These modems are identified abbreviated in the following as CO modems.

The central office 10 contains in turn output end CO modems of which the CO modem 12 is detailed in the following. This CO modem 12 is connected via a dedicated line 14 to a subscriber modem 16, termed abbreviated RT modem in the following. The method to be described results in resynchronizing of data transfer via the dedicated line 14 between the CO modem 12 and RT modem 16 after a fault has occurred on the dedicated line due to a ringing signal.

Assuming now that data is being continually transferred via the dedicated line 14 from the CO modem 12 to the RT modem 16, at some point in time a ringing signal needs to be transferred via the dedicated line 14 to the RT modem 16 since a subscriber wishes to make a telephone call to a subscriber at the RT modem 16 end. Instead of the central office 10 immediately passing on this ringing signal via the dedicated line, a ringing ID is simply set in the central office modem, i.e. in the CO modem 12 (step 100) and a ringing alert transferred to the RT modem 16 (step 110) signalling this modem that a ringing signal is to arrive after a predefined delay. Since the ringing ID comprises only a single bit, transferring this bit would not assure that the remote module is informed of the imminent transfer of a ringing signal. This is why to enhance the security the ringing alert consisting of several bits is transferred to the remote module.

After transfer of the ringing alert the central office 10 interrupts transfer of the pilot tone accompanying the data transfer via the CO modem 12 to the RT modem 16 (step 120).

This pilot tone is made use of in normal data transfer in the RT modem 16 by known ways and means as a reference for synchronizing a clock frequency generator employed in this modem. Due to the pilot tone being interrupted the RT modem 16 also terminates analysis of this pilot tone for synchronizing.

Both the CO modem 12 and the RT modem 16 then assume a hold status in which the characteristic parameters for the momentary data transfer are saved. These parameters also include the parameters dictating clock frequency synchronization implemented continually in the remote module with the pilot tone as reference, these being parameters for setting a PLL circuit used for this purpose. After the change to this save status the ringing signal is transferred to the RT modem 16 (step 130). Immediately thereafter the ringing ID is reset in the CO modem 12 (step 140). This prompts the CO modem 12 to retransfer the pilot tone to the RT modem 16 via the CO modem 12, the RT modem 16 then reassuming analysis of this pilot tone and the synchronization of the clock generator contained therein (step 1C).

In making use of the transfer parameters saved prior, the transfer status is reinstated in both the CO modem 12 and RT modem 16 as having existed prior to the change into the save status (step 160).

For resynchronizing the modems the RT modem 16 now merely needs to search for and recognize characteristic code groups in the transferred data stream identifying the start of data blocks and groups thereof. This takes up little time, there being no need for time-consuming sensing the line parameters likewise needed for a complete resynchronization since due to the aforementioned step 160 in which the data transfer status was reinstated prior to transfer of the ringing signal the transfer parameters as used before are again made use of.

In making use of the method as described, resynchronization is thus limited substantially to simply analyzing the data stream without having to implement the time-consuming procedure of sensing the transfer parameters on the dedicated line. The resulting speed-up in the resynchronizing method is considerable, it having been discovered that, after a fault, data transfer can be reinstated within but approximately 0.7 sec.

In the claims:

1. A method of resynchronizing data transfer between two modems connected by a dedicated line following a fault caused by a ringing signal, whereby at least one of the modems is assigned to a central office and the other modem is assigned to a remote subscriber comprising the following steps:

a) setting a ringing ID in the central office modem as soon as a ringing signal is to he sent to the subscriber modem connected via the dedicated line;

b) transferring a ringing alert to the connected subscriber modem;

c) interrupting transmission of the pilot tone accompanying the data transfer set by the central office modem and interrupting clock frequency synchronization implemented during data transfer in the subscriber modem with the pilot tone as reference;

d) signalling the central office modem and subscriber modem on hold to save the characteristic parameters for the momentary data transfer in the two modems followed by transfer of the ringing signal via the dedicated line to the subscriber modem;

e) resetting the ringing ID in the central office modem;

f) resending the pilot tone via the central office modem and reinstating synchronization of the clock frequency in making use of the pilot tone as reference;

g) reestablishing the data transfer mode existing prior to step d) in making use of the characteristic parameters as saved before;

h) synchronizing the subscriber modem to the data stream coming from the central office modem by searching for and detecting specific code groups occurring regularly in the transferred data stream.

2. The method as set forth in claim 1, wherein in step d) in the subscriber modem parameters for setting a PLL circuit are saved.

* * * * *